United States Patent [19]

Tateuchi et al.

[11] Patent Number: 5,149,371
[45] Date of Patent: Sep. 22, 1992

[54] CONVEYING SYSTEM

[75] Inventors: Makoto Tateuchi; Kentaro Ozue, both of Hiroshima, Japan

[73] Assignee: Mazda Motor Corporation, Hiroshima, Japan

[21] Appl. No.: 673,999

[22] Filed: Mar. 25, 1991

[30] Foreign Application Priority Data

Mar. 30, 1990 [JP] Japan ............... 2-34358[U]

[51] Int. Cl.[5] ........................... B05C 13/02
[52] U.S. Cl. ..................... 118/56; 118/64; 118/66; 118/58; 118/324
[58] Field of Search ......... 118/56, 66, 72, 73, 118/64, 320, 322, 324, 58, 634; 198/378, 376

[56] References Cited

U.S. PATENT DOCUMENTS 4,874,639 10/1989 Matsui et al. ............... 118/56

Primary Examiner—W. Gary Jones
Assistant Examiner—Brenda Lamb
Attorney, Agent, or Firm—Fish & Richardson

[57] ABSTRACT

Disclosed is a conveying system in which a conveying carriage runs on and along a conveying passageway, for example, a coating passageway, which has a support unit for rotatably supporting the works of an automotive vehicle, i.e. a vehicle body, and a locking mechanism for suspending rotation of the works. The passageway is provided in its given position, e.g., on the downstream side of a drying station, with a rotation-suspending station so disposed in a position of the predetermined conveying passageway for suspending the rotation of the works in its given rotary position. The rotation-suspending station has driving means acting upon a rotary system for the works loaded on the conveying carriage for rotating the works; rotary-position detecting switch for detecting the predetermined rotary position of the works; and a lock operating mechanism for operating the locking mechanism when the predetermined rotary position of the works is detected by the rotary-position detecting switch. The driving mechanism, rotary-position detecting switch and the lock operating mechanism are employed in common with a number of carriages running on the passageway.

40 Claims, 8 Drawing Sheets

CONVEYING SYSTEM

BACKGROUND OF THE INVENTION

1. Field of the Invention

The present invention relates to a conveying system and, more particularly, to a conveying system in which a substrate is conveyed while rotating.

2. Description the Related Art

There are occasions where substrates supported by the conveying carriage are desired to be rotated on the conveying carriage in order to perform a predetermined series of operations. For example, U.S. Pat. No. 4,874,639 (corresponding to Japanese Patent Laid-open (kokai) Publication No. 178,871/1988) discloses the technology involving a substrate as works with a paint in a film thickness exceeding the thickness which causes sagging, unless otherwise treated in the coating step, and rotating the coating substrate about approximately horizontal line in parallel to the axis of the coating substrate in the drying step prior to the time when the paint starts sagging until the paint is cured to such an extent that it does not cause sagging. The range of the rotating speeds of the substrate in this case is from the speed at which the substrate is rotated so as to change the position of the substrate upon which gravity acts prior to causing sagging due to gravity to the speed at which no sags are caused due to centrifugal force.

This patent discloses the technology of rotating the substrate loaded on the conveying carriage by utilizing the relative speed difference between the main and auxiliary conveyors. The main conveyor is provided for conveying the carriage and an auxiliary conveyor is disposed along the main conveyor.

It is desired, however, that the substrate loaded on the conveying carriage be suspended in the predetermined position for the following step, when the rotation of the works is not needed any more. For instance, when an automotive vehicle body is to be coated while rotating, it is desired that the body be suspended in its upright position for an assembly step which follows after drying of the paint.

From this point of view, it is considered that the conveying carriage is provided with a mechanism for suspending the works in the predetermined upright position when the carriage has reached the point of time when the coating of the works has been finished and no rotation of the works is needed any longer. At this end, such a mechanism includes, for example, a locking mechanism for locking the rotation of the works in a predetermined position, means for detecting the position in which the works are rotated, operation means for operating the locking mechanism when the works have reached the predetermined position and auxiliary driving means for rotating the works in the predetermined position. Since a number of instruments are provided on the conveying carriage, the carriage becomes so large in size and expensive that it is disadvantageous to have a number of such expensive carriages disposed in the coating station of an assembly line. Further, coating of the works using such carriages requires a large surplus of energy particularly in drying the coat in a drying oven in order to heat and maintain the works at the predetermined temperatures.

SUMMARY OF THE INVENTION

Therefore, the present invention has been performed under the circumstances as described hereinabove. Given the rotation of the substrate loaded on the conveying carriage, the object of the present invention is to provide a conveying system so adapted to reduce the number of equipment to be mounted to the conveying carriage as much as possible and to suspend the rotation of the works in the predetermined position at a desired time.

In order to achieve the object, the present invention consists of a conveying system comprising:

a conveying carriage so disposed as to run on and along a predetermined conveying passageway, which has a support section for rotatably support works and a locking mechanism for suspending rotation of the works;

and a rotation-suspending station for suspending the rotation of the works in its predetermined rotary position in a predetermined position of the predetermined conveying passageway;

wherein the rotation-suspending station has driving means acting upon a rotary system for the works loaded on the conveying carriage for rotating the works; rotary-position detecting means for detecting the predetermined rotary position of the works; and locking means for operating the locking mechanism when the predetermined rotary position of the works is detected by the rotary-position detecting means.

The aforesaid arrangement for the conveying system permits the works to assume the predetermined rotary position for sure by rotating the works by the driving means when the carriage has arrived in the predetermined position of the rotation-suspending station and to stop rotating by operation of the locking mechanism by the locking means at the time when the rotary-position detecting means has detected the predetermined rotary position which the works have reached.

As described hereinabove, the conveying system according to the present invention does not require any additional equipment but the locking mechanism to be equipped on the conveying carriage because any other equipment can be equipped in the rotation-suspending station, thereby eliminating the number of equipment and parts to be otherwise equipped on conventional conveying carriages.

Further, as the rotation-suspending station is provided with the driving means for rotating the works, the works can be rotated up to the predetermined rotary position and allowed to stop in the predetermined rotary position even if they would have been stopped in any position prior to conveyance to the rotation-suspending station.

It is to be noted that the conveying system according to the present invention can be applied to, for example, a coating line, as described in the claim portion of this description as will be described hereinafter.

Other objects, features and advantages of the present invention will become apparent in the course of the description of the preferred embodiments, which follows, in conjunction with the present invention.

DESCRIPTION OF THE PREFERRED EMBODIMENTS

The present invention will be described more in detail by way of examples in conjunction with the accompanying drawings. In this embodiment, a coating substrate is coated with a paint in a film thickness in which the paint coated sags if not rotated and the coating substrate with the paint coated thereon is rotated at a predetermined rotational speed about an approximately horizontal axis, as described in more detail in U.S. Pat. No. 4,874,639.

Figure 1:
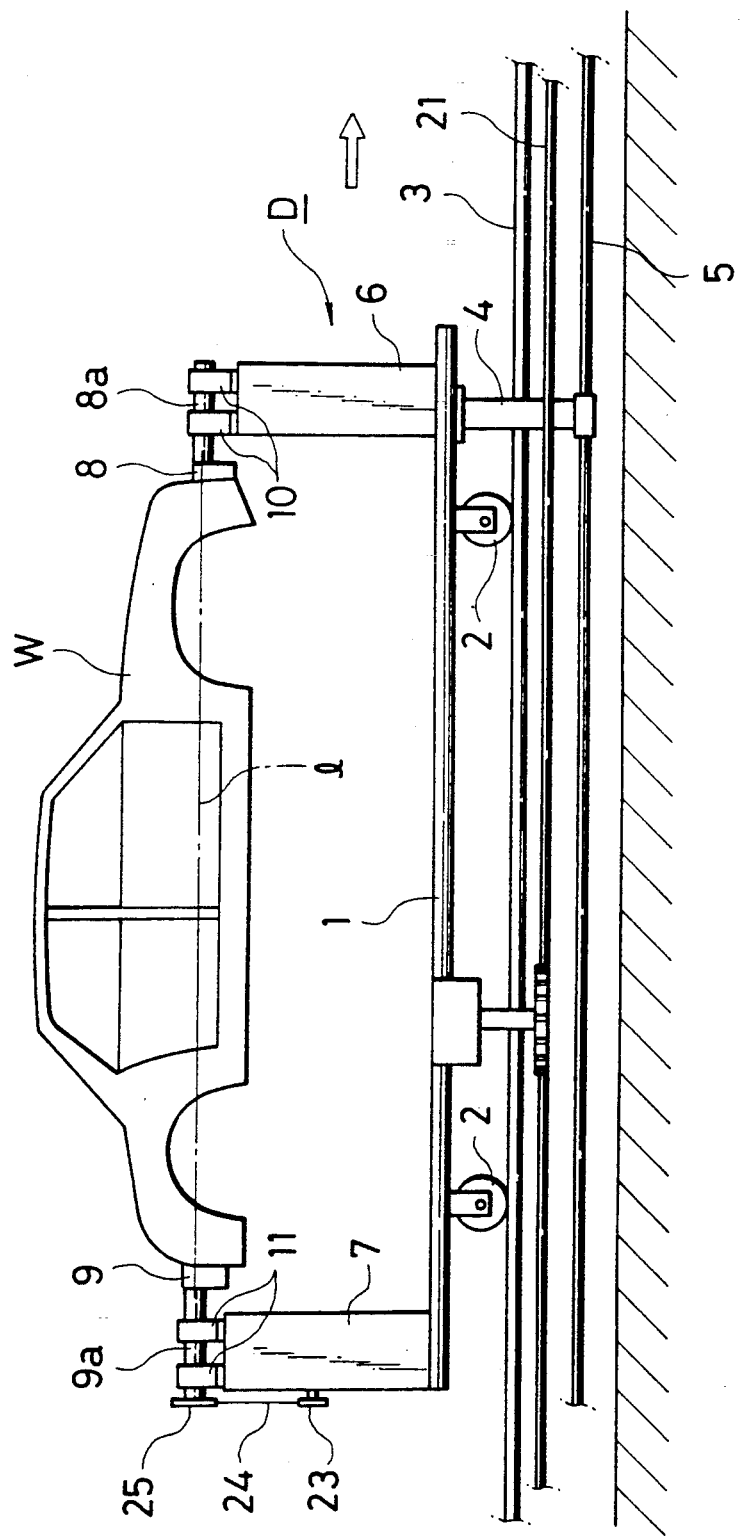
FIG. 1 is a side view showing an embodiment of the conveying system according to the present invention.

Referring to FIG. 1, a conveying carriage D is shown to have a base plate 1 with wheels 2 so mounted integrally thereto so as to run on a railway 3. Under the base plate 1 is integrally mounted a stay 4 to which is fixed a tractive wire 5 as a main conveyor. The conveying carriage D is conveyed to the right from the left in FIG. 1 by the tractive force of the wire 5.

A pair of forward and rearward supports 6 and 7 are disposed to stand upright on the base plate 1 so as to function each as a support section and to rotatably support an automotive vehicle body W. To the body W is fixed a forward rotary jig 8 at its front portion and a rearward rotary jig 9 at its rear portion. A rotary axle portion 8a of the forward rotary jig 8 is rotatably supported through a bearing 10 by the forward support 6, while a rotary axle portion 9a of the rearward rotary jig 9 is rotatably supported through a bearing 11 by the rearward support 7. The forward rotary axle portion 8a is so disposed as to lie in the same line l as the rearward rotary axle portion 9a and the line l is so set as to lie in an approximately horizontal axis extending in the longitudinal direction of the body W.

A chain 21 is disposed as an auxiliary conveyor along the wire 5 as the main conveyor. This chain functions as means for providing rotation and is of a toothed long-length body. The body W is rotated at a relative speed difference between the wire 5 and the chain 21.

Figure 2:
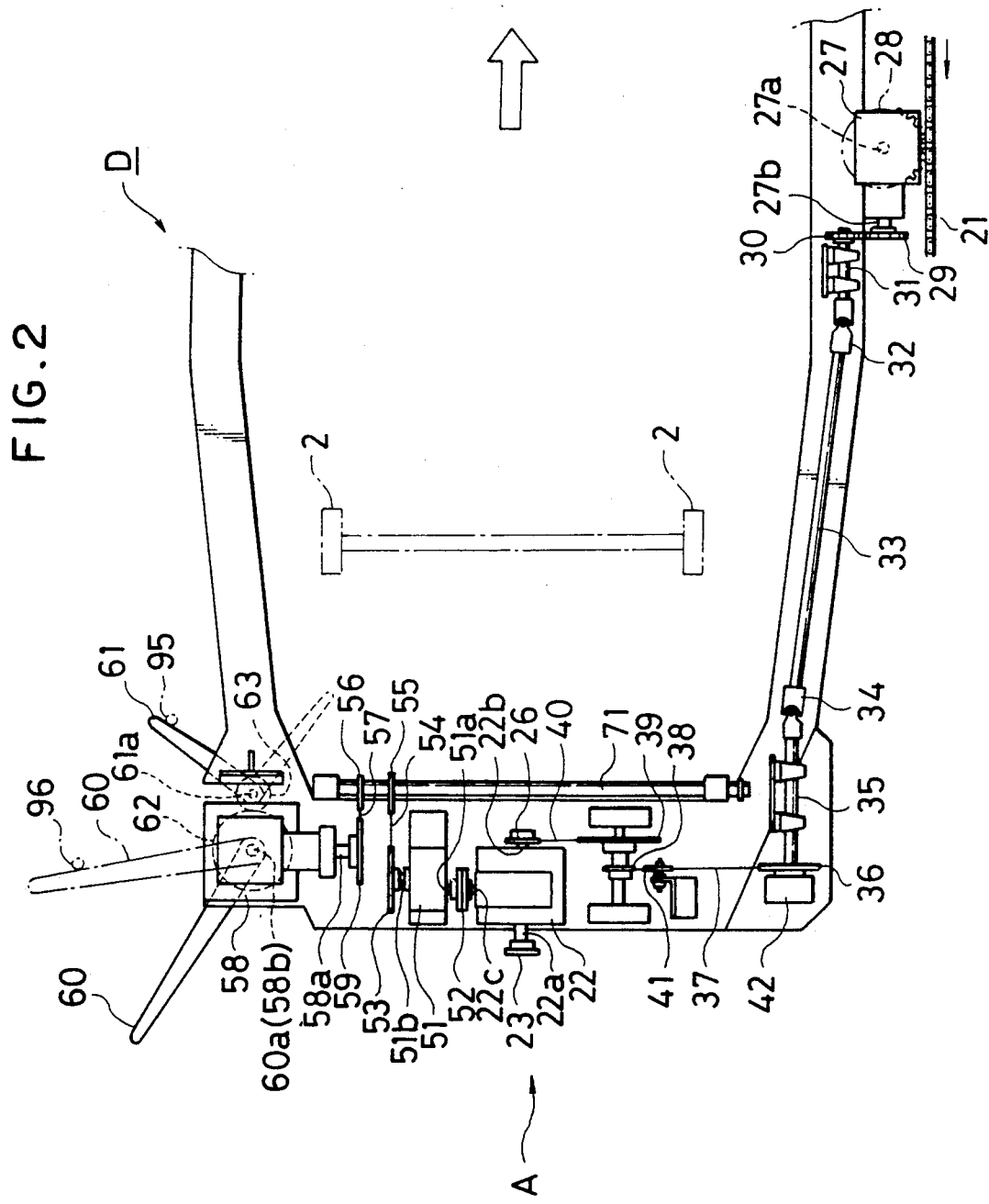
FIG. 2 is a plan view showing a mechanism for rotating an automotive vehicle body by using the relative speed difference between main and auxiliary conveyors.
Figure 3:
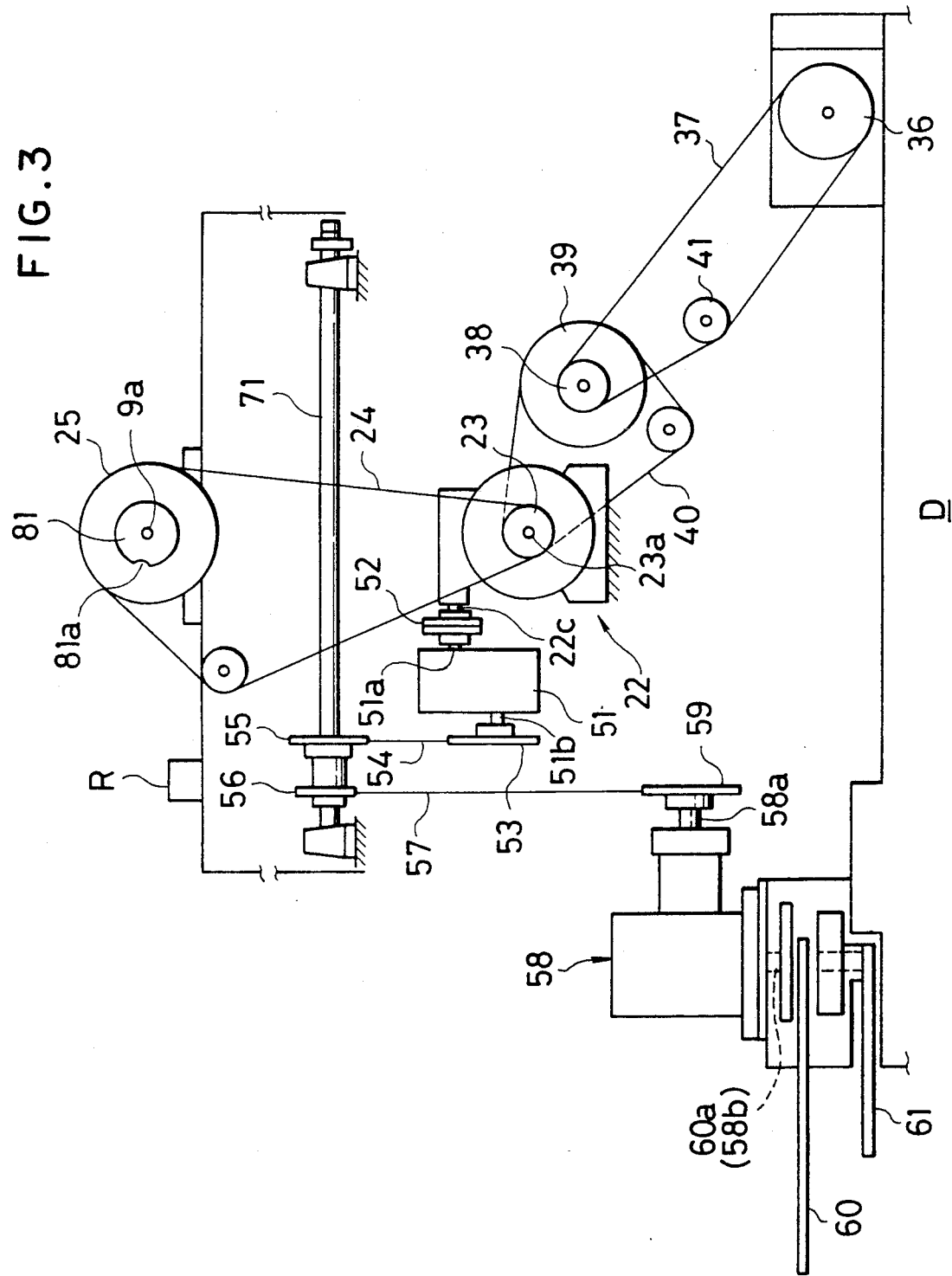
FIG. 3 is a view in the direction as indicated by arrow A in FIG. 2.

Description will now be made of a rotary mechanism for rotating the body W. A main portion of the rotary mechanism is built in the rearward support 7 as shown in FIGS. 2 and 3. As shown in FIGS. 2 and 3, reference numeral 22 denotes a continuously variable transmission as rotary speed adjusting means, which is arranged such that a sprocket 23 disposed to its output shaft 22a is associated with a sprocket 25 disposed at a rotary axle portion 9a of the rearward rotary jig 9.

The sprocket 26 disposed to the input shaft 22b of the continuously variable transmission 22 is associated with the chain 21 as the auxiliary conveyor. More specifically, the base plate 1 has a gear box 27 disposed in the vicinity of the chain 21, and a sprocket 28 disposed at the input shaft 27a of the gear box 27 is engaged with the chain 21. The sprocket 28 functions as a toothed rotary body. The rotation of the sprocket 28 is taken out as rotation of the output shaft 27b of the gear box 27, and the rotation of the output shaft 27b is transmitted to a shaft 35 through a gear 29, a gear 30 engaged with the gear 29, a shaft 31 connected to the gear 30, a universal joint 32 mounted to the shaft 31, a shaft 33 and a universal joint 34 connected at its one end to the shaft 33 and at the other end to the shaft 35. The rotation of the shaft 35 is then transmitted to a sprocket 26 disposed at an input shaft 22b of the continuously variable transmission 22. In other words, the rotation of the shaft 35 is first transmitted to a sprocket 36 connected to the shaft 35 through a chain 37 to sprockets 38 and 39. The chain 37 is disposed to be wound about the sprockets 36 and 38 and an idle sprocket 41. The rotation of the sprocket 38 is then transmitted from the sprocket 39 mounted coaxially with the sprocket 38 to the sprocket 26 through a chain 40 wound about the sprockets 39 and 26. The arrangement can rotate the body W by rotating the sprocket 28 engaged with the chain 21 as the auxiliary conveyor. The speed at which the body W is rotated is determined by a rotational speed of the sprocket 28 and by a shift ratio of the continuously variable transmission. Reference numeral 42 stands for a torque limiter. The torque limiter 42 is so disposed as to protect an association mechanism between the sprocket 28 and the body W by performing the sliding action when a large degree of rotary load is applied to the body W.

As shown in FIG. 3, the shift ratio of the continuously variable transmission 22 is changed by a shift mechanism including the transmission 51. A shift ratio adjusting shaft 22c of the continuously variable transmission 22 is connected through a joint 52 to an output shaft 51a of the transmission 51. An input shaft 51b of the transmission 51 is associated with a sprocket 59 disposed at an output shaft 58a of the gear box 58 through a sprocket 53 mounted to the input shaft 51b, the sprocket 53 being connected through a chain 54 to a sprocket 55 which in turn is mounted to a sprocket 56 connected through a chain 57 to the sprocket 59. The sprocket 59 is connected through the output shaft 58a to the gear box 58 which has two operating levers 60 and 61.

As shown in FIG. 2, the operating lever 60 is of a straight line form and the operating lever 61 is of an approximately L-shaped form, and the operating lever 60 is associated with the operating lever 61 through gears 62 and 63, respectively. In the drawing, reference numerals 60a and 61a denote rotational centers of the respective operating levers 60 and 61. The operating levers 60 and 61 are to rotate the input shaft 58b (60a) of the gear box 58 and, when they are in the state as indicated by the solid line in FIG. 2, the continuously variable transmission 22 is in the decelerating state. When the operating lever 60 is rotated at nearly 45° in the clockwise direction as indicated by the arrow in FIG. 2 from the state of FIG. 2, the continuously variable transmission 22 is brought into the state of accelerating as indicated by the dot-dash line in FIG. 2. Likewise, when the operating lever 61 is rotated at nearly 90° in the counterclockwise direction as indicated by the arrow in FIG. 2 from the state of FIG. 2, the continuously variable transmission 22 is brought into the state of accelerating. The disposition of the transmission 51 is to change a shift ratio of the continuously variable transmission 22 to a great extent even if the angle of pivoting the operating lever 60 or 61 would become small.

Each of the sprockets 55 and 56 interposed between the gear box 58 and the continuously variable transmission 22 are integrally mounted to a shaft 71.

Figure 6:
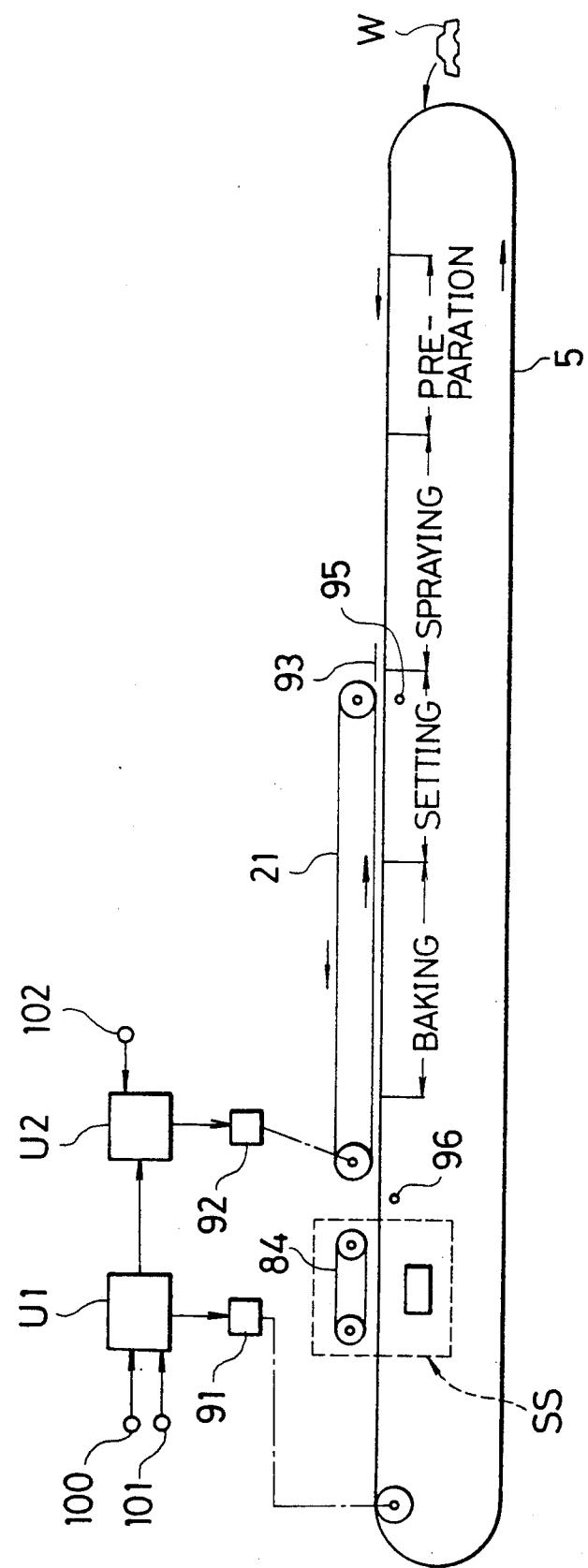
FIG. 6 is a schematic plan view showing an example of the conveying passageway.

FIG. 6 shows the relationship of the disposition between the wire 5 as the main conveyor and the chain 21 as the auxiliary conveyor. The wire 5 is of an endless type and is driven by a motor 91. Likewise, the chain 21 is of an endless type and is driven by a motor 92. The wire 5 is so disposed as to extend over the entire length of a series of preparation, spraying, setting and baking steps, while the chain 21 is so disposed as to travel along the wire 5 extending over the length of the setting and baking steps, because the body W is rotated at a predetermined rotational speed during the setting and baking steps. At a site between the spraying step and the setting step, a fixed chain 93 is secured in order to permit a smooth rise of rotation of the body W. Description will be made of a series of the operations of coating the body W with the paint. First, the body W is loaded on a conveying carriage D prior to the preparation step and the body W loaded on the conveying carriage D is conveyed to the preparation step where dirt and other foreign matter present inside and outside of the body W are removed. Then, in the spraying step, the body W is then sprayed with the paint in such a film thickness as exceeding a sagging limit of the paint that causes sagging unless otherwise treated. In other words, for example, a thermosetting paint may generally cause sagging when it is sprayed in the film thickness as thick as 40 microns or thicker, so that the thermosetting paint is sprayed in the film thickness as thick as 80 microns, for example, in this embodiment. The paint is sprayed by means of electrostatic coating, or electrostatic atomizing coating. The drying step comprises the setting step and the baking step. The setting step is carried out at temperatures lower than that in the baking step, in order to volatilize low boiling-point components in the paint coated. In the setting step, the body W is rotated about the axis 1 before the paint causes sagging. In the baking step, too, the body W is rotated about the axis 1. Subsequent to the baking step, the body W is transferred to a rotation-suspending station SS where the rotation of the body W is suspended and the body W is unloaded. The conveying carrier D from which the body W has been unloaded is then transferred to a step where a fresh body W is to be loaded again in the manner as described hereinabove.

In the stage where the body W is transferred from the spraying step to the setting step, the sprocket 28 for taking out rotational force of the body W is engaged with the fixed chain 93. At this time, the operating lever 60 is brought into the decelerating state by manual operation as indicated by the solid line in FIG. 1, thereby making the rotational speed of the body W low. This is so made because the body W is in the initial stage of rotating.

As the sprocket 28 starts engaging with the chain 21, the rotational speed of the body W increases when the shift ratio of the continuously variable transmission is the same, because the direction of travel of the chain 21 is opposite to the direction of travel of the wire 5. As the conveying carriage D travels to some extent in the direction of travel of the conveying carriage, the operating levers 60 and 61 are brought into the position of accelerating, thereby rotating the body W at a desired speed. The rotational speed of the body W is so set as to lie within the scope ranging from the speed at which the vehicle W is so rotated as to change the direction of gravity acting upon the paint coated upon the body W prior to causing the paint to sag to the speed at which the paint causes no sagging due to centrifugal force. As shown in FIG. 2, a striker 95 is disposed at the position at which acceleration is required in order to bring the operating levers 60 and 61 into the state of accelerating, and the operating lever 61 is brought into abutment with the operating lever 60 in the position as indicated by the dot-dash line in FIG. 2.

As the sprocket 28 is still engaged with the chain 21 immediately after the baking step has been finished, the body W is kept on rotating. At this time, however, the operating levers 60 and 61 are in the state of decelerating and the rotational speed is reduced largely for preparation for suspending the rotation of the body W. In this embodiment, in order to cause decelerating, a striker 96 is disposed in the position where deceleration is required, as shown in FIG. 2, and the operating lever 60 is abutted with the striker 96.

The strikers 95 and 96 constitute rotational speed altering means for altering the rotational speed of the body W in accordance with the position in which the body W loaded on the carrying carriage D is conveyed.

The wire 5 is driven or suspended by a manual switch 100. If the coat on the body W stayed in the setting step or in the baking step is not yet cured to a sufficient extent when the wire 5 is suspended, the coat causes sagging. At this time, a signal indicative of suspension of the wire 5 is generated to a control unit U2 for driving the chain 21 from a control unit U1 for controlling the motor 91 so arranged as to respond to an input from the switch 100. In response to the signal generated by the control unit U1, the control unit U2 maintains the rotating speed of the body W in the same state as the state prior to suspension of the wire 5 by increasing the speed for driving the chain 21 so as to maintain the relative speed difference prior to the suspension of the wire 5.

A switch 101 is to give an instruction for altering a conveying speed of the wire 5. In this case, too, the control unit U2 maintains the rotational speed of the body W to a constant level by changing the speed of the chain 21 in correspondence to a variation in the speed of the wire 5. A switch 102 is to give an instruction for driving or suspending the chain 21.

Then, the rotation-suspending station SS for suspending the rotation of the body W and a locking mechanism disposed on the conveying carriage D are described with reference to FIGS. 4 to 6.

The locking mechanism R disposed on the conveying carriage D comprises a lock pin 72 disposed slidably on the rearward support 7 and a locking hole 73 disposed in the rotary jig 9. When the body W is supported by the rotary jig 9, that is, in a predetermined rotary position (upright position) as shown in FIG. 1, a top end portion of the lock pin 72 is so disposed as to be inserted into or detached from the locking hole 73. The rotation of the body W is locked in the state of FIG. 4 in which the lock pin is inserted into the locking hole 73. On the side of a base end portion of the lock pin 72, a crank lever 75 is so mounted through a pin 74 on the support 7 as to be rotatable about the pin 74 and further as to be slidably engaged with a pin 72a disposed on the base end portion of the locking pin 72 through a long hole 75a formed at one end portion of the lever 75.

The rotation-suspending station SS is provided with a holding arm 77 moving reciprocally by a cylinder 76 in the direction approximately intersecting the passage of travel of the conveying carriage D. To the holding arm 77 are mounted a cylinder 78 as locking means acting upon the crank lever 75 and a position detecting arm 79 for detecting the predetermined rotary position of the body W.

A roller 80 is rotatably held at a top end portion of the position detecting arm 79 and the rotary shaft 9a of the conveying carriage D in the rotation-suspending station SS lies in the line extending in the axis of the top end of the position detecting arm 79. To the rotary shaft 9a is fixed a cam 81 having a concave portion 81a at the periphery thereof. The body W is located in the predetermined rotary position when the concave portion 81a lies in the line extending in the axis of the position detecting arm 79.

The position detecting arm 79 is biased by a spring 82 toward the side of the cam 81. This arrangement allows the roller 80 to be inserted into the concave portion 81a of the cam 81 when the body W assumes the predetermined rotary position, and an operating piece 83a of the limit switch 83 is inserted into the concave portion 79a formed on an externally peripheral surface of the arm 79. At this time, the limit switch 83 is turned on to detect that the body W is in the predetermined rotary position. When the roller 80 is not located in the concave portion 81a of the cam 81, that is, when the body W does not assume the predetermined rotary position, the position detecting arm 79 is further displaced to the left in the drawing from the state of FIG. 5, thereby turning the limit switch 83 off.

In the rotation-suspending station SS, a conveyor 84 composed of a chain for rotating the body is further disposed along the main conveyor 5. The conveyor 84 is engaged with the sprocket 28 for taking out the rotation, mounted to the conveying carrier D, so that the body W loaded on the conveying carrier D can optionally be rotated in the rotation-suspending station SS, too, by controlling a motor (not shown) for driving the conveyor 84.

Figure 7:
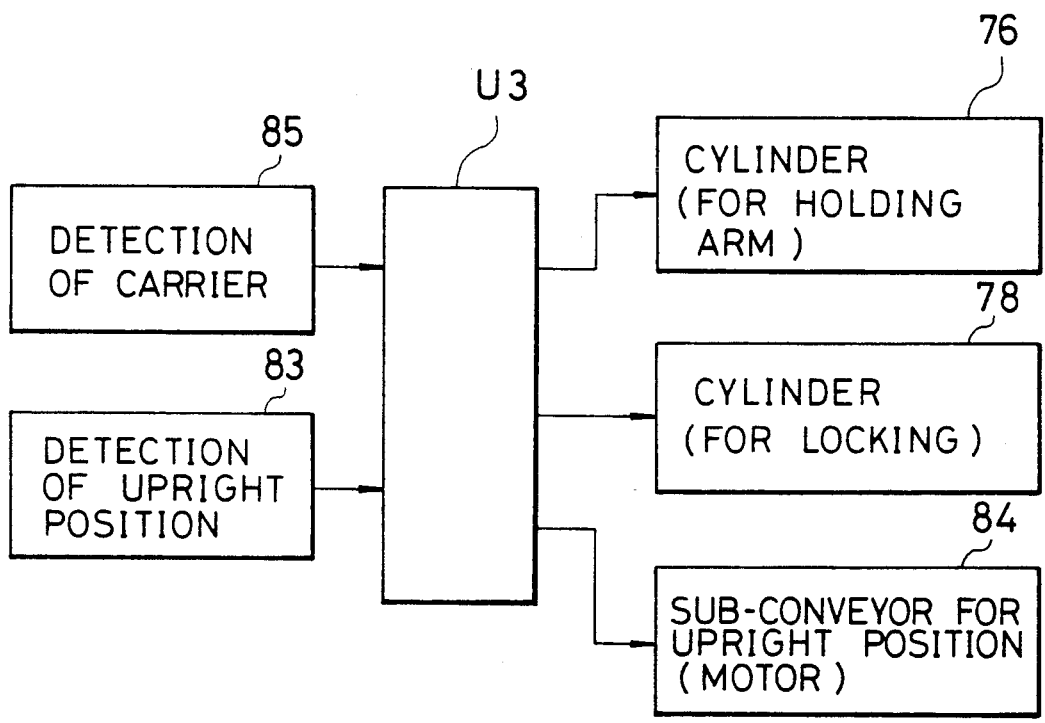
FIG. 7 is a diagrammatic representation showing a control system for the rotation-suspending station.

FIG. 7 shows a control system for the station SS, in which reference symbol U3 denotes a control unit and reference numeral 85 denotes a sensor for sensing the presence of the conveying carrier D in the station SS.

Figure 8:
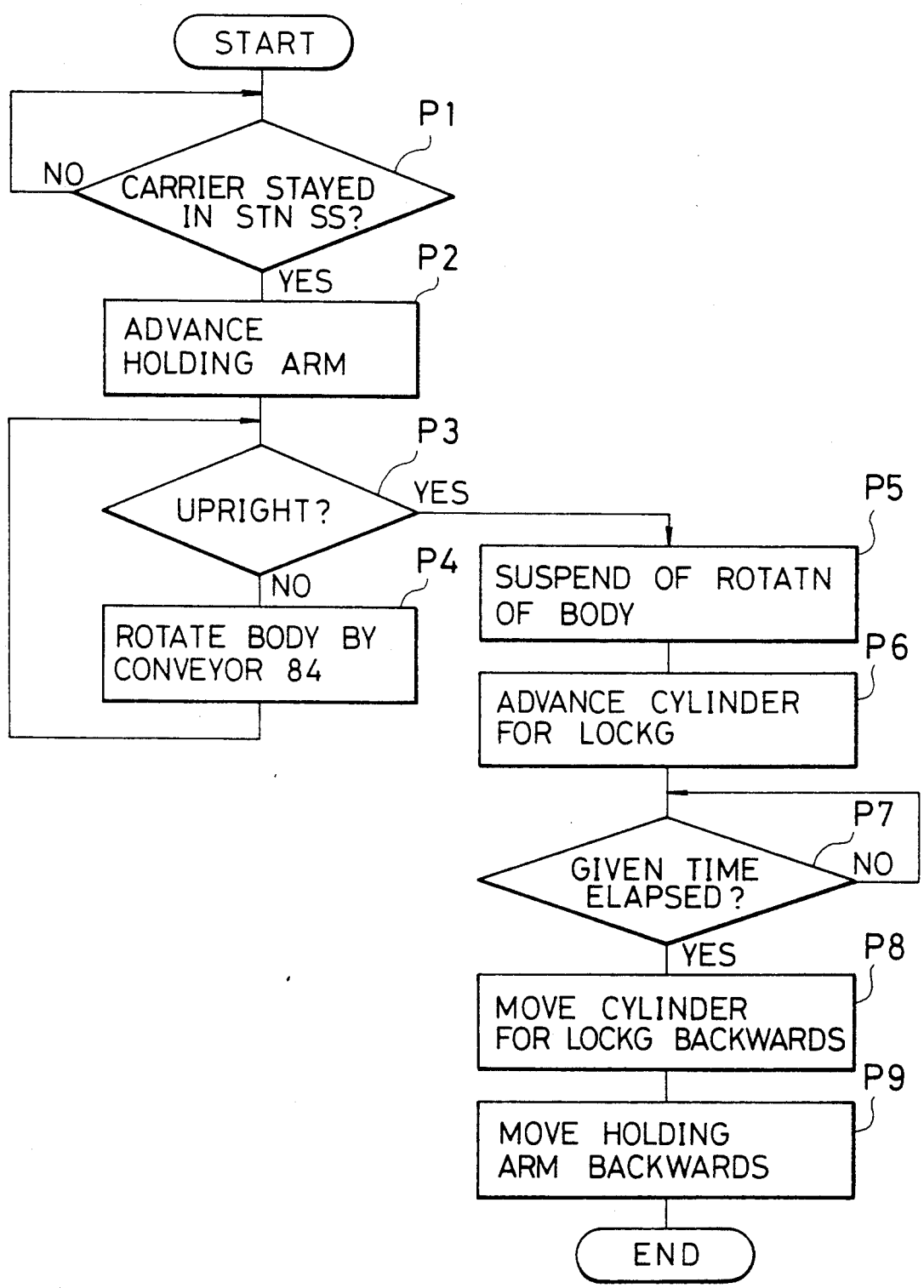
FIG. 8 is a flow chart showing the control contents for the rotary control system of FIG. 7.

Description will then be made of the control contents by a control unit U with respect to the flow chart as shown in FIG. 8.

First, at step P1, a decision is made to determine if the conveying carrier D is advanced and conveyed to the rotation-suspending station SS. When it is decided at step P1 at which the carriage D is conveyed to the rotation-suspending station SS, then the program flow goes to step P2 and the holding arm 77 assumes the advancing position as shown in FIGS. 4 and 5. Then, at step P3, a decision is made to determine if the body W assumes the determined rotary position, that is, if it is standing upright. When it is decided at step P3 that the body W does not assume the predetermined rotary position, on the one hand, then the program flow goes to step P4 at which the body W is rotated toward the predetermined rotary position by using the conveyor 84. When the result of decision at step P3 indicates that the body W assumes the predetermined rotary position, on the other hand, then the program flow goes to step P5 at which the rotation of the body W by the conveyor 84 is suspended. The direction and the speed of driving the conveyor 84 are so set as to correspond to the speed of travel of the main conveyor 5.

Figure 4:
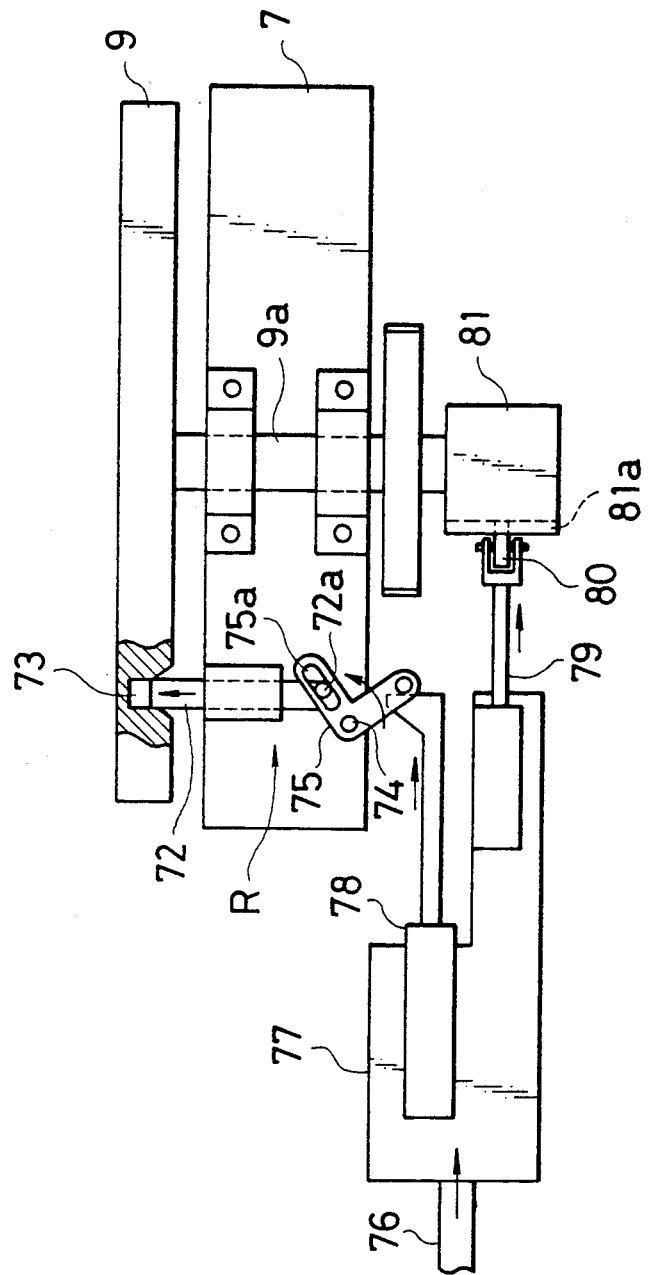
FIG. 4 is a plan view showing an essential portion of the rotation-suspending station.
Figure 5:
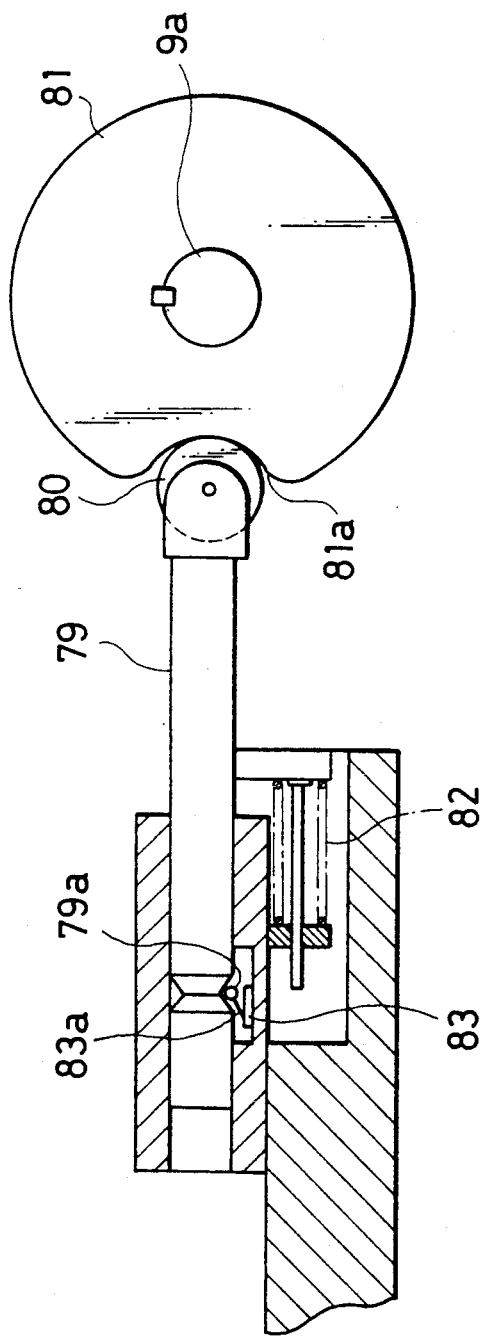
FIG. 5 is a partially sectional, side view showing a mechanism for detecting the rotary position of the substrate.

After step P5, the program flow goes to step P6 at which the cylinder 78 is advanced to the locked position as shown in FIG. 4 in which the lock pin 72 is locked through the crank lever 75. Thereafter, at step P7, a decision is made to determine if a predetermined period of time has been elapsed. When it is decided at step P7 that the predetermined period of time has been elapsed, then the program flow goes to step P8 at which the locking cylinder 78 is moved backwards, followed by proceeding to step P9 at which the holding arm 77 is moved backwards. The step P7 is provided to anticipate a delay in a period of time until the lock pin 72 advances into the locking hole 73 from the operation of the cylinder 78.

Although the present invention has been described hereinabove by way of examples, it is to be understood that the sprocket 28 may be replaced by a pinion while the chains 21, 84 and 93 may be replaced as racks. Further, although FIG. 6 is directed to the coating line for overcoating, i.e. spraying an overcoating paint in the spraying step, the coating line may be for intercoating.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What ia claimed is:

1. A conveying system comprising:
   a conveying carriage so disposed as to run on and along a predetermined conveying passageway, which has a support unit including a means for rotatably supporting a substrate and a locking mechanism for suspending rotation of the substrate;
   and a rotation-suspending station so disposed in a predetermined position of the predetermined conveying passageway as to suspend the rotation of the substrate in its predetermined rotary position;
   wherein the rotation-suspending station has means acting upon the means for rotatably supporting the substrate which are structured and arranged on the conveying carriage for suspending rotation of the substrate; rotary-position detecting means for detecting the predetermined rotary position of the substrate; and locking means for operating the locking mechanism when the predetermined rotary position of the substrate is detected by the rotary-position detecting means.

2. A conveying system as claimed in claim 1, wherein the means for rotatably supporting the substrate includes a rotary jig on the support unit.

3. A conveying system as claimed in claim 2, wherein the locking mechanism operates the rotary jig to suspend rotation of the substrate.

4. A conveying system as claimed in claim 1, wherein the locking mechanism has a lock pin engageable with the means for rotatably supporting the substrate; and
   the locking means is pressed toward a position in which the lock pin is locked.

5. A conveying system as claimed in claim 1, wherein the rotary-position detecting means has a switch so disposed as to operate when the substrate assumes its predetermined rotary position.

6. A conveying system as claimed in claim 5, wherein the means for rotatably supporting the substrate includes a cam so disposed as to rotate in synchronization with rotation of the substrate; and the rotary-position detecting means has a cam follower abuttable with the cam and the switch is operable by the cam follower.

7. A conveying system as claimed in claim 1, wherein the conveying carriage has a toothed rotary body and transmitting mechanism for transmitting rotation of the toothed rotary body to the substrate supported by the support unit and the means acting upon the means for rotatably supporting the substrate is disposed along the conveying passageway and comprises a toothed long-length body engageable with the toothed rotary body and drivable by a driving source.

8. A conveying system as claimed in claim 7, wherein the toothed long-length body is a chain; and the toothed rotary body is a sprocket.

9. A conveying system as claimed in claim 7, wherein the toothed long-length body is on an endless type.

10. A conveying system as claimed in claim 1, wherein the rotation-suspending station has a holding arm so disposed as to move forwards or rearwards with respect the conveying carriage located in the rotation-suspending station; and the holding arm holds the rotary-position detecting means and the locking means.

11. A conveying system as claimed in claim 10, further comprising carriage-detecting means for detecting location of the conveying carriage in the rotation-suspending station;

wherein the holding arm is so operated as to advance toward the conveying carriage located in the rotation-suspending station when the location of the conveying carriage is detected by the carriage-detecting means.

12. A conveying system as claimed in claim 1, wherein the substrate is an automotive vehicle body.

13. A conveying system as claimed in claim 1, wherein the conveying carriage is conveyed by traction.

14. A conveying system as claimed in claim 13, wherein traction means for contracting the conveying carriage is a wire disposed along the conveying passageway for conveying the conveying carriage.

15. A conveying system as claimed in claim 14, wherein the conveying passageway, or the wire, is of an endless type.

16. A conveying system as claimed in claim 1, wherein the support unit supports the works so as to rotate about an approximately horizontal axis of the substrate.

17. A conveying system as claimed in claim 1, wherein the conveying passageway extends over the length of a coating passageway for coating the substrate.

18. A conveying system as claimed in claim 17, wherein the rotation-suspending station is disposed in the conveying passageway on the downstream side of the coating passageway.

19. A conveying system comprising:

a conveying carriage so disposed as to run on and along a predetermined coating passageway, which has a support unit for rotatably supporting a substrate, a toothed rotary body so disposed as to be rotatable, a transmitting mechanism for transmitting rotation from the toothed rotary body to the substrate supported by the support unit, and a locking mechanism for suspending rotation of the substrate;

wherein the predetermined coating passageway has a spraying station for spraying the substrate supported on the conveying carriage with a paint, a drying station located on the downstream side of the spraying station for drying the paint coated on the substrate, and a rotation-suspending station disposed on the downstream side of the drying station for suspending rotation of the substrate in a predetermined rotary position;

wherein the drying station has means for providing rotation to the toothed rotary body; and wherein the rotation-suspending station has means for suspending rotation of the substrate; rotary-position detecting means for detecting a rotary position of the substrate; and locking means for operating the locking mechanism when the predetermined rotary position of the substrate is detected by the rotary-position detecting means.

20. A conveying system as claimed in claim 19, wherein the toothed rotary body for taking out rotation is a sprocket; and the means for providing rotation is a chain.

21. A conveying system as claimed in claim 20, wherein the chain is drivable by a driving source.

22. A conveying system as claimed in claim 21, wherein the chain is of an endless type.

23. A conveying system as claimed in claim 20, wherein the support unit supports the substrate so as to rotate about an approximately horizontal axis of the substrate;

the paint is sprayed in the coating station at least on a upwards-extending surface of the substrate in a film thickness in which the paint coated thereon starts sagging unless otherwise treated; and a speed of rotating the substrate to be set by the means for providing rotation is fast enough to prevent the paint coated thereon from sagging due to gravity yet low enough to cause no sagging of the paint coated thereon due to centrifugal force created by rotation of the substrate.

24. A conveying system as claimed in claim 23, wherein the chain is of an endless type and drivable by a driving source.

25. A conveying system as claimed in claim 24, wherein the chain is drivable by a driving source in the direction opposite to the direction of travel of the carriage.

26. A conveying system as claimed in claim 24, further comprising control means for adjusting a speed of driving the chain so as to allow a rotational speed of the substrate to reach a rotational speed prior to suspension of rotation of the carriage.

27. A conveying system as claimed in claim 24, wherein the chain is so disposed in a portion of the coating passageway between the spraying station and the drying station so as to be engaged with the sprocket and fixed so as to provide rotation to the sprocket due to travel of the carriage.

28. A conveying system as claimed in claim 23, wherein a torque limiter is disposed in the transmitting means.

29. A conveying system as claimed in claim 23, wherein a shift mechanism is disposed in the transmitting means.

30. A conveying system as claimed in claim 29, wherein a striker is so disposed in a predetermined position of the coating passageway as to be engageable with a lever for altering a shift ratio of the shift mechanism and to alter the shift ratio of the shift mechanism.

31. A conveying system as claimed in claim 29, wherein the coating passageway has:
   first shift mechanism operating means for altering the shift ratio of the shift mechanism so as to make the rotational speed of the substrate greater by acting upon the shift mechanism between the spraying station and the drying station; and
   second shift mechanism operating means for altering the shift ratio of the shift mechanism so as to make the rotational speed of the substrate smaller by acting upon the shift mechanism between the drying station and the rotation-suspending station.

32. A conveying system as claimed in claim 23, wherein the drying station comprises a setting step and a baking step subsequent to the setting step; and
   an ambient temperature for the setting step is set to be lower than an ambient temperature for the baking step.

33. A conveying system as claimed in claim 23, wherein the means for suspending rotation of the substrate is a chain of an endless type engageable with the toothed rotary body and drivable by a driving means.

34. A conveying system as claimed in claim 23, wherein the substrate is supported on the support unit by a rotary jig.

35. A conveying system as claimed in claim 23, wherein the locking mechanism has a lock pin engageable with a rotary system of the substrate; and
   the locking means is pressed toward a position in which the lock pin is locked.

36. A conveying system as claimed in claim 23, wherein a cam is so disposed in a rotary system of the substrate as to rotate in synchronization with rotation of the substrate; and
   the rotary-position detecting means has a cam follower abuttable with the cam and a switch which is operable by the cam follower.

37. A conveying system as claimed in claim 23, wherein the rotation-suspending station has a holding arm so disposed as to move forwards or rearwards with respect the conveying carriage located in the rotation-suspending station; and
   the holding arm holds the rotary-position detecting means and the locking means.

38. A conveying system as claimed in claim 37, further comprising carriage-detecting means for detecting location of the conveying carriage in the rotation-suspending station;
   wherein the holding arm is so operated as to advance toward the conveying carriage located in the rotation-suspending station when the location of the conveying carriage is detected by the carriage-detecting means.

39. A conveying system as claimed in claim 23, wherein the substrate is an automotive vehicle body.

40. A conveying system as claimed in claim 23, wherein the coating passageway in the spraying station is set for coating an overcoating paint.

* * * * *